L. D. Taylor.
Hay Loader.

No. 64459. Patented May 7, 1867.

Witnesses.
Edward H. Knight
Chas. D. Smith

Inventor.
L. D. Taylor
by Munn & Co
Attorneys

United States Patent Office.

LUMAN D. TAYLOR, OF GRANVILLE CENTRE, PENNSYLVANIA.

Letters Patent No. 64,459, dated May 7, 1867.

IMPROVEMENT IN HAY-LOADER.

*The Schedule referred to in these Letters Patent and making part of the same.*

TO ALL WHOM IT MAY CONCERN:

Be it known that I, LUMAN D. TAYLOR, of Granville Centre, in the county of Bradford, and State of Pennsylvania, have invented a new and improved Hay-Loader; and I do hereby declare the following to be a full, clear, and exact description of the same, sufficient to enable one skilled in the art to which the invention appertains to make use of it, reference being had to the accompanying drawings, which form a part of this specification, and in which—

Figure 1:
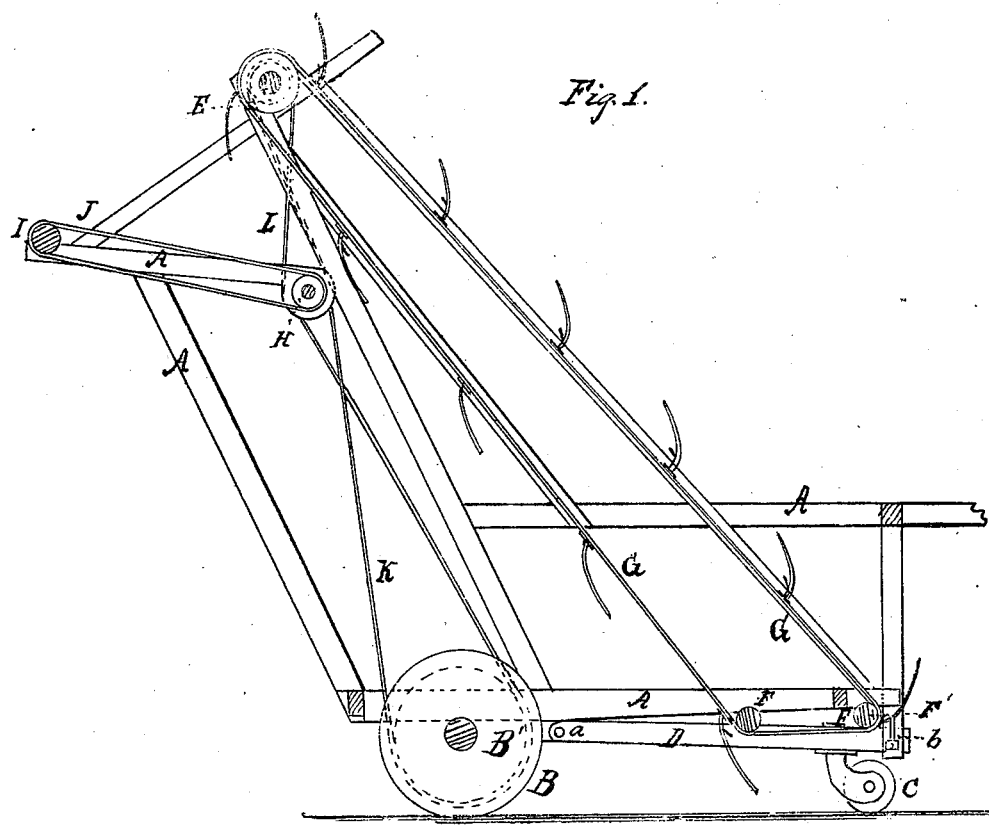
Figure 1 is a vertical section.
Figure 2:
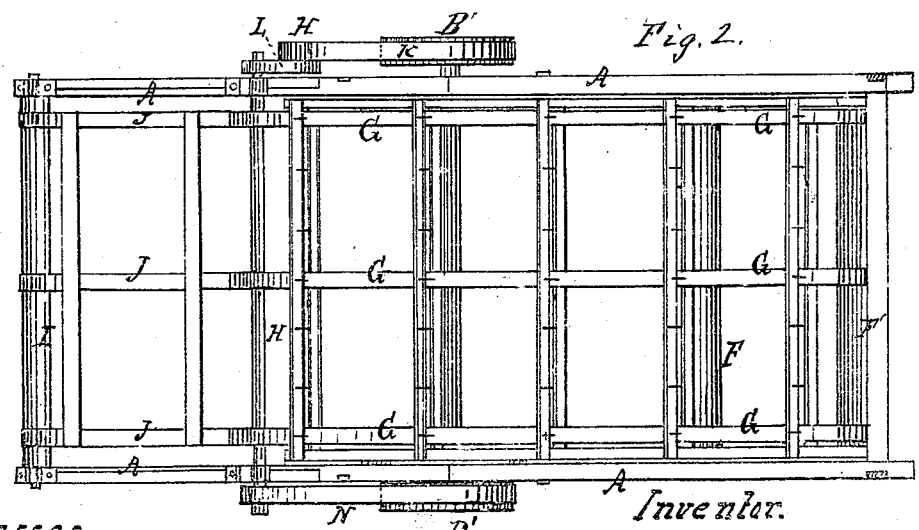
Figure 2 is a top view or plan.

The endless belt armed with teeth is driven by bands from the ground-wheels. It runs over three rollers, one at the top and two at the bottom; the latter are separated for a given distance, so that the teeth are travelling in a direction parallel with the surface for a certain distance while raking up the hay, and do not merely dip into the swath as they pass around the under side of a single lower roller. Arrangements are made for the delivery of the hay by a horizontally-traversing belt, and for graduating the distance of the elevating teeth from the surface of the ground. The machine is constructed to run ahead of the wagon or alongside of it, and is drawn by two horses spanning the windrow.

In the drawings, A is the frame supported on driving-wheels B and caster-wheels C on the lower frame D. In the frame A are journalled the upper roller E and the lower rollers F F', around which the endless belt G passes. Pivoted in the frame A are two rollers, H I, carrying the belt J, which discharges the elevated hay into the back of the wagon. The belts G J are driven by bands K L. The band K passes from a drum, B', on the driving-wheel's shaft to a pulley on the shaft of the roller H, and drives the belt J. The belt G is driven by the band L from a pulley on the shaft of roller H. The frame D is pivoted at $a$ to the frame A, and is vibrated on this bearing, and adjusted by means of the set-screws $b$, which elevate or depress the rear end of the elevator, so as to regulate the inclination or position of the operating teeth to adapt the machine to rough or even ground. As the rollers F F' are at or about the same horizontal plane when at work, the teeth pass horizontally over the surface for that part of their course represented by the distance between the axis of the rollers F F', which makes a much more complete operation than can be performed by an endless rake which passes over the periphery of but one lower roller, and has no horizontal motion, but simply dips down and catches up the hay at one point of its motion. The motion-belt on one side of the machine may proceed direct from the drum B' on the shaft of the ground-wheel B to the pulley on the shaft of roller E, as exemplified at N in the plan view.

Having described my invention, what I claim as new, and desire to secure by Letters Patent, is—

I claim the arrangement, in the pivoted and adjustable frame D, of the belt G and auxiliary-delivery belt J, substantially as described and represented.

LUMAN D. TAYLOR.

Witnesses:
C. N. SEYFLES,
HENRY BAILEY,
WM. S. SPALDING.